Patented July 28, 1936

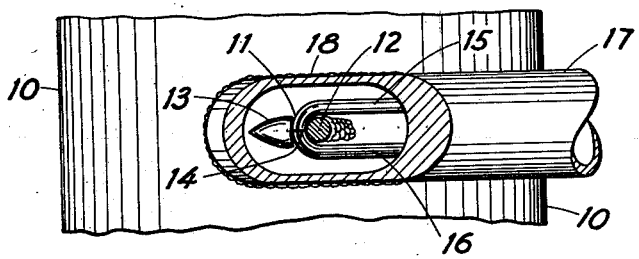
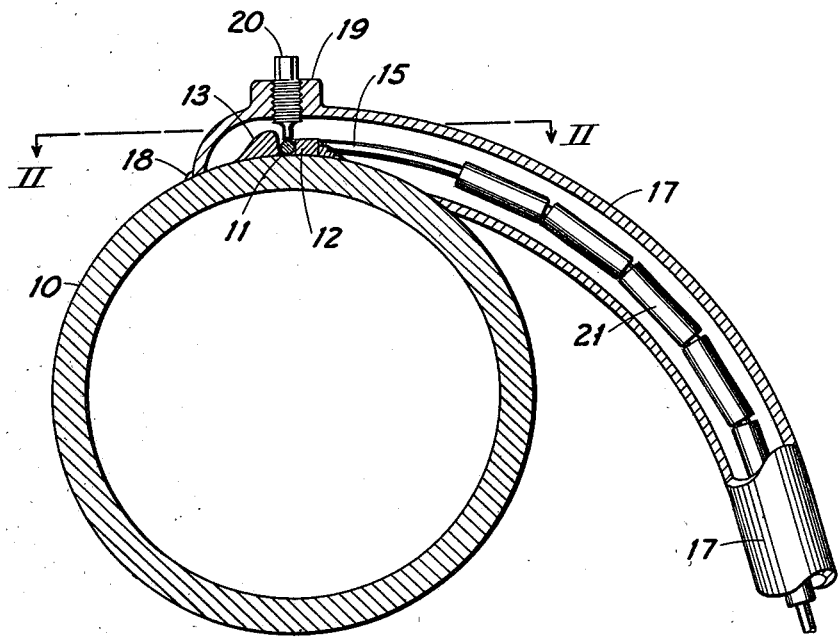

2,048,680

UNITED STATES PATENT OFFICE 2,048,680

THERMOCOUPLE SHIELD

Milo A. Bird and Charles F. Tuttle, Richmond, Calif., assignors to Standard Oil Company of California, San Francisco, Calif., a corporation of Delaware Application December 24, 1934, Serial No. 758,930

6 Claims. (Cl. 136—4)

This invention relates to high temperature measuring equipment, and particularly to a shield for protecting thermocouples, which may be attached to heated bodies, such as tubes in oil heaters, from corrosive gases and physical damage.

Heretofore, thermocouples in services of this type have been held to the heated body whose temperature is to be determined by being welded thereto, or by being peened or swaged into a drilled hole, or a metal clip secured to the surface of the body. A tube of corrosion- and temperature-resistant metal was then placed over the thermocouple wires, and securely welded at its juncture with the body to make a tight joint therewith and prevent the rapid deterioration of the thermocouple wires that would otherwise occur. Such installations are found to give fairly consistent temperature indications, but are particularly difficult to replace or repair, as each time such is to be done, the outer tube must be removed and rewelded. Under some conditions this repeated welding has a serious effect on the metal of the main body and may cause failure thereof.

It is an object of this invention to provide a shield in which the junction of the thermocouple wires will be securely held against the body whose temperature is to be determined to obtain a consistent and accurate result, and which wires will also be removable therefrom, without disturbing the sheath or shield which protects the wires from the effect of radiant heat or corrosive gases.

Another object is to provide a thermocouple shield which is easily and economically fabricated and installed, and in which the wires may readily be replaced or repaired if damaged during the severe conditions of service they must withstand.

These and other objects and advantages will be more fully apparent from the following description and from the accompanying drawing, which forms a part of this specification, and illustrates a preferred embodiment of this invention.

In the drawing, Figure 1 is a vertical sectional view of a shield as applied to a metal tube, and illustrates the clamping means employed.

Figure 2 is a sectional view on line II—II of Figure 1 and shows the arrangement of the thermocouple wires and junction within the shield and clamp.

Referring to the drawing, the numeral 10 indicates a metal tube, such as is used in tubular oil heaters, and which may attain a temperature above redness, or in the neighborhood of 1000°–1200° F. A saddle 11 is preferably formed on the tube surface at the point where the temperature is to be determined, for example, by welding on a short metal stud 12, and a built-up stop 13 of deposited weld metal. These may be shaped by filing or grinding to form the saddle or seat 11 against the metal of tube 10 into which saddle the butt welded junction loop 14 of the thermocouple wires 15 and 16 may be received and held, as will be described below.

After the saddle 11 is completed, the tubular shield 17, preferably of a temperature-resistant material such as 18% chromium, 8% nickel iron alloy, is welded as at 18 to the tube 10, completely enclosing the saddle 11, and preferably extending out of the furnace chamber. Shield 17 is provided with a hollow boss 19 which is threaded to receive a short screw 20, also preferably of alloy material. Boss 19 is so positioned that the inner end of screw 20 is aligned with saddle 11, in order that screw 20 may be screwed down to hold the junction loop 14 of the thermocouple wires 15 and 16 closely against the metal of tube 10.

The thermocouple wires 15 and 16 may be of the usual "Chromel-Alumel" materials, and are electrically insulated from tubes 10 and 17 by means of the conventional porcelain beads 21.

The method of installing and removing the thermocouple junction and wires from the improved shield is apparent from the foregoing description and the drawing, particularly Figure 2.

To remove the wires, the screw 20 is loosened sufficiently to permit the loop 14 to be withdrawn from the saddle 11, whereupon the wires may be pulled out of tube 17 for inspection or repair. To install a new thermocouple, the loop 14 is thrust into tube 17 until it strikes stop 13, whereupon screw 20 may be tightened to hold the junction in saddle 11.

It will be noted that the thermocouple junction 14 is exposed substantially only to heat flow from the tube 10, the shielding tube 17, which may be at a higher temperature, being out of contact with the junction except through the small area of contact with screw 20. This arrangement has been found to be sufficiently accurate and very advantageous from the standpoint of thermocouple inspections, replacements and repairs.

Although a specific construction embodying this invention has been described and illustrated, it is to be understood that the invention is not limited to that specific device, and all such modifications and changes as come within the scope of the appended claims are embraced thereby.

We claim:

1. A shielded thermocouple assembly comprising a thermocouple junction, a saddle adapted to receive said junction and formed on the body whose temperature is to be determined, a tubular shield secured to said body and enclosing said saddle, and clamping means in said shield for retaining said junction in said saddle, said clamping means adapted to be loosened to permit removal of said thermocouple without disturbing said shield.

2. A shielded thermocouple assembly according to claim 1, in which said clamping means comprises a screw passing through said shield and aligned with said saddle for retaining said junction therein.

3. A shielded thermocouple assembly according to claim 1, in which said tubular shield is spaced from said saddle to prevent transfer of heat therebetween.

4. In apparatus for measuring the temperature of a metal body, a thermocouple junction, a shield for said junction secured to said body, and means in said shield for clamping said junction to said body, said last named means adapted to be loosened to permit removal of said thermocouple without disturbing said shield.

5. In apparatus for measuring the temperature of a metal tube, a saddle formed on said tube, a thermocouple junction adapted to be received in said saddle, a shield welded to said tube enclosing said saddle, and clamping means in said shield for holding said junction in contact with said tube.

6. In apparatus for measuring the temperature of a metal body, a thermocouple junction, a shield for said junction permanently secured to said body, and means operable from the outside of said shield for removably clamping said junction to said body without disturbing said shield.

MILO A. BIRD.
CHARLES F. TUTTLE.